(12) United States Patent
Shinohara

(10) Patent No.: US 9,182,251 B2
(45) Date of Patent: Nov. 10, 2015

(54) ANGLE DETECTOR AND MOTOR DRIVE CONTROLLER

(75) Inventor: Makoto Shinohara, Kanagawa-ken (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 306 days.

(21) Appl. No.: 13/593,381

(22) Filed: Aug. 23, 2012

(65) Prior Publication Data

US 2013/0249452 A1    Sep. 26, 2013

(30) Foreign Application Priority Data

Mar. 23, 2012  (JP) .................................. 2012-067256

(51) Int. Cl.
| G01B 7/30 | (2006.01) |
| H02P 6/16 | (2006.01) |
| G06F 19/00 | (2011.01) |
| G01D 5/20 | (2006.01) |
| H02P 6/00 | (2006.01) |
| H03M 1/48 | (2006.01) |

(52) U.S. Cl.
CPC .................................... G01D 5/2073 (2013.01)

(58) Field of Classification Search
USPC .............................. 318/400.04, 400.12, 400.3
See application file for complete search history.

(56) References Cited

U.S. PATENT DOCUMENTS

| 5,767,639 | A | * | 6/1998 | Sakaguchi et al. ....... 318/400.11 |
| 7,859,254 | B2 | | 12/2010 | Nakazato et al. |
| 8,004,434 | B2 | * | 8/2011 | Nakazato et al. ............. 341/115 |
| 8,188,896 | B2 | | 5/2012 | Sata et al. |
| 8,487,563 | B2 | * | 7/2013 | Kawakami et al. ...... 318/400.13 |
| 8,716,964 | B2 | * | 5/2014 | Tanaka et al. ............. 318/400.01 |
| 2009/0179634 | A1 | * | 7/2009 | Nakazato et al. ........ 324/207.25 |
| 2010/0097052 | A1 | * | 4/2010 | Lillestolen et al. ...... 324/207.25 |
| 2011/0090104 | A1 | * | 4/2011 | Sata et al. ..................... 341/116 |
| 2011/0140689 | A1 | * | 6/2011 | Fernando et al. ........ 324/207.25 |
| 2012/0197591 | A1 | * | 8/2012 | Shinohara ..................... 702/151 |

FOREIGN PATENT DOCUMENTS

| JP | 09-37585 A | 2/1997 |
| JP | 2008-039583 | 2/2008 |
| JP | 2009-145273 | 7/2009 |

(Continued)

OTHER PUBLICATIONS

Japanese Office Action for corresponding Japanese Application No. 2012-067256, dated Jun. 3, 2014, 9 pages.

(Continued)

*Primary Examiner* — Paul Ip
*Assistant Examiner* — Said Bouziane
(74) *Attorney, Agent, or Firm* — Knobbe, Martens, Olson & Bear LLP

(57) ABSTRACT

Certain embodiments provide an angle detector comprising: an AD converter configured to analog-to-digital convert plural-phase signal waves having respective different phases; a corrector configured to delay a phase of an excitation signal by an amount corresponding to a phase difference between the excitation signal and the signal wave; a wave detector configured to perform synchronous detection to an output signal from the AD converter in synchronization with the excitation signal whose phase is corrected; and an angle calculator configured to calculate an estimated rotation angle using an output signal of the wave detector and output the estimated rotation angle to the AD converter.

20 Claims, 13 Drawing Sheets

(56) References Cited

FOREIGN PATENT DOCUMENTS

| | | |
|---|---|---|
| JP | 2009-171051 | 7/2009 |
| JP | 2010-110147 A | 5/2010 |
| JP | 2011-089885 A | 5/2011 |

OTHER PUBLICATIONS

Japanese Office Action for corresponding Japanese Application No. 2012-067256, dated Jan. 23, 2015 in 7 pages.

* cited by examiner

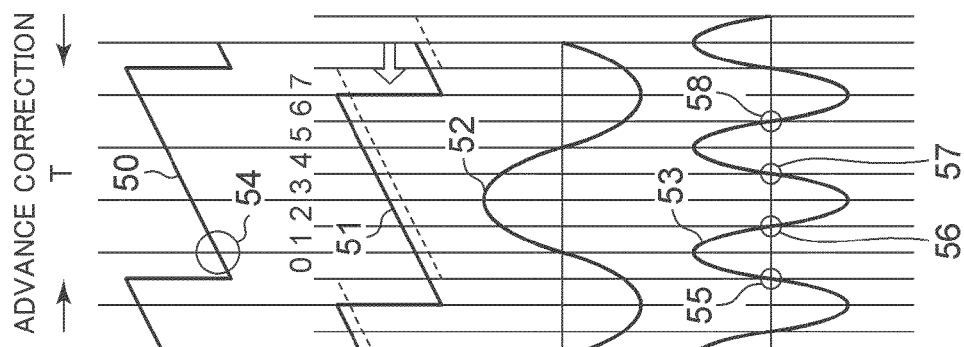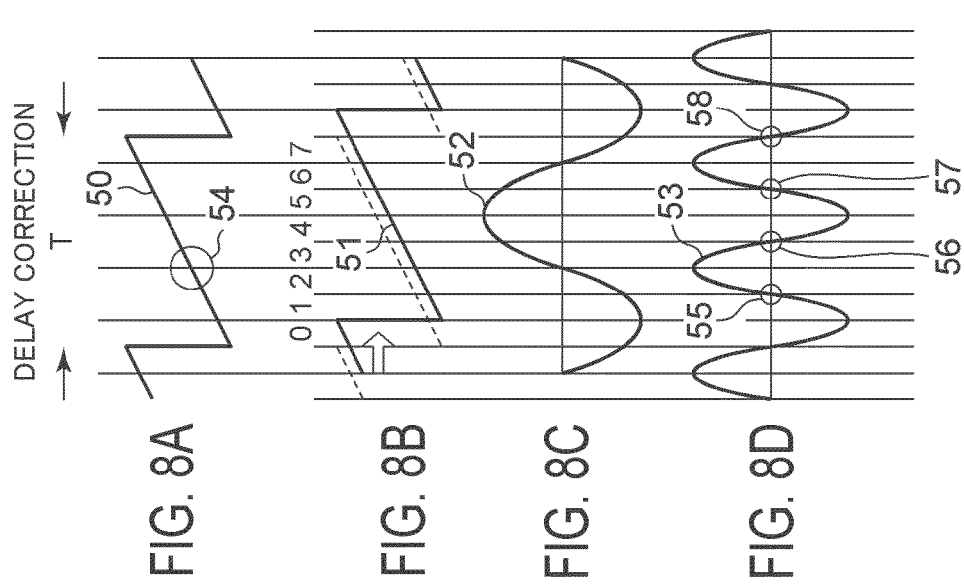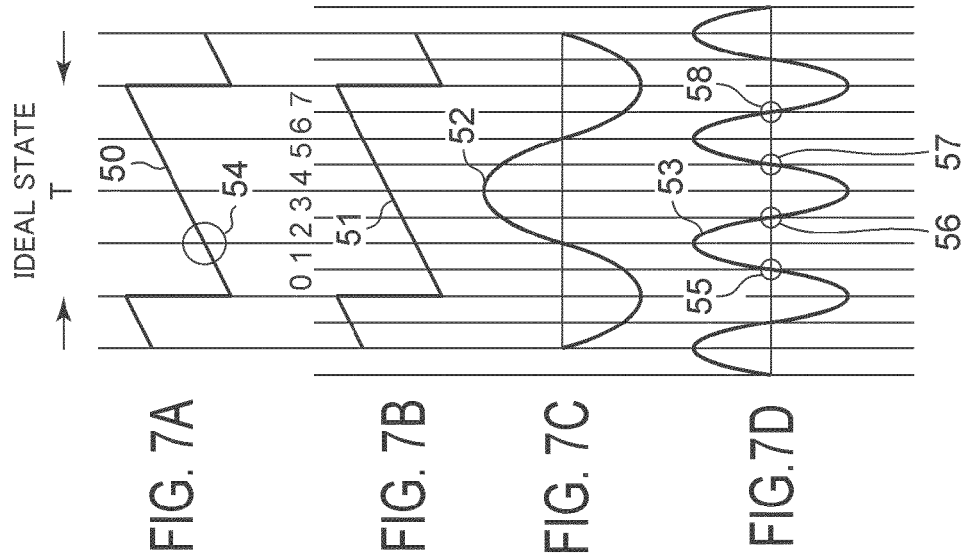

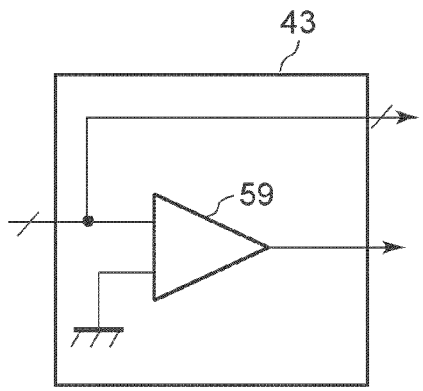
FIG. 10A
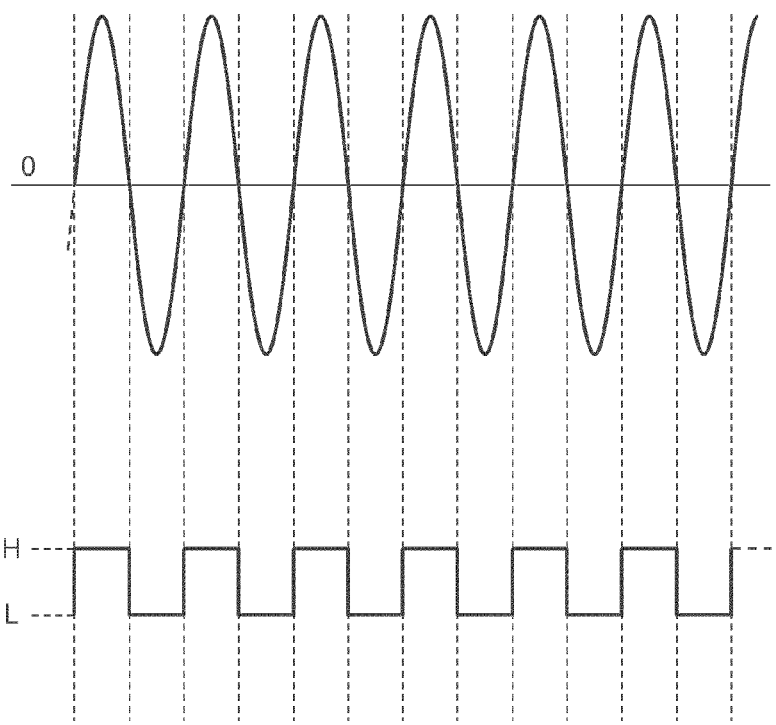
FIG. 10B
FIG. 10C

US 9,182,251 B2

ANGLE DETECTOR AND MOTOR DRIVE CONTROLLER

CROSS-REFERENCE TO RELATED APPLICATION

The present application claims priority under 35 U.S.C. 119 to Japanese Patent Application Ser. No. 2012-067256, filed on Mar. 23, 2012, the entire disclosure of which is incorporated herein by reference.

FIELD

An embodiment relates to an angle detector and a motor drive controller.

BACKGROUND

A system of a vehicle applies an excitation wave to an exciting coil of a resolver. The system receives two signal waves from a sin phase coil and a cos phase coil of the resolver. The excitation wave has a sinusoidal waveform having a constant amplitude level. A signal wave is referred to as an amplitude-modulated wave having a waveform obtained by amplitude-modulating the excitation wave by a rotation angle. For example, two-phase signal waves are $\sin\theta\cdot\sin\omega t$ and $\cos\theta\cdot\sin\omega t$. $\omega$ represents an angular frequency of the excitation wave or the excitation signal.

In prior art, there has been known a resolver digital convertor which AD (analog-to-digital) converts an AC signal output from a resolver and detects a point at which the amplitude of the AC signal is 0. There has been known a circuit which obtains a rotation angle by measuring a time difference of a zero-cross point at which voltage levels of two-phase AC signals cross the zero level.

BRIEF DESCRIPTION OF THE DRAWINGS

FIGS. 7A to 7D are time charts for explaining phase correction of a signal wave in an ideal state in the corrector of the angle detector according to the embodiment;

FIGS. 8A to 8D are time charts for explaining the phase correction of the signal wave whose phase is delayed in the corrector of the angle detector according to the embodiment;

FIGS. 9A to 9D are time charts for explaining the phase correction of the signal wave whose phase is advanced in the corrector of the angle detector according to the embodiment;

FIGS. 10A to 10C are views for explaining a rising detector in a detector used in the corrector of the angle detector according to the embodiment;

DETAILED DESCRIPTION

Figure 1:
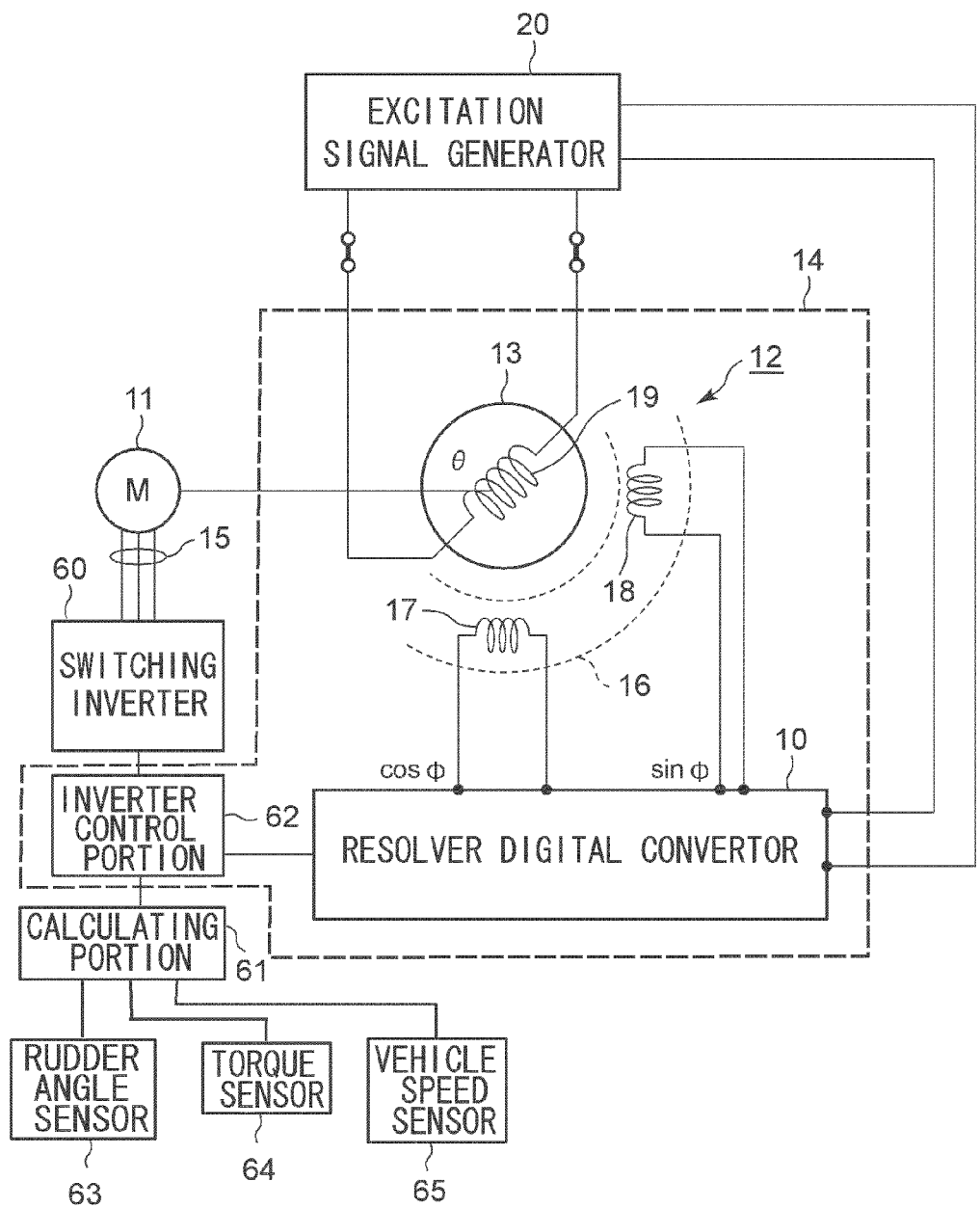
FIG. 1 is a view showing a configuration example of a vehicle including an angle detector and a motor drive controller according to an embodiment.

When an integral multiple of an excitation period and a rotation period of a motor approach each other, however, a waveform of a signal wave after AD conversion may not pass through a zero level point. Consequently, bias of a phase correction value occurs, and error of an angle detection value is increased.

By way of example, a repetition frequency of a pulse signal in an excitation signal is 10 kHz, a rotation angle frequency of the motor is 2.5 kHz, and an excitation period (1/10 kHz) is four times a motor rotation period (1/2.5 kHz). A resolver digital converter inputs digital signals $\sin\theta\cdot\sin\omega t$ and $\cos\theta\cdot\sin\omega t$ after AD conversion to a high pass filter. The high pass filter distorts each signal. In one period of a signal wave, the amplitude of a signal wave may not reach zero level at a phase point to be detected as a zero-cross point. The resolver digital converter cannot necessarily detect the zero-cross point.

Certain embodiments provide an angle detector comprising: an AD converter configured to analog-to-digital convert plural-phase signal waves having respective different phases obtained by amplitude-modulating an excitation wave by a rotation angle of a rotation shaft; a corrector configured to be inputted an excitation signal and the converted plural-phase signal waves from the AD converter and delay a phase of the excitation signal by an amount corresponding to a phase difference between the excitation signal and the signal wave; a wave detector configured to perform synchronous detection to an output signal from the AD converter in synchronization with the excitation signal whose phase is corrected; and an angle calculator configured to calculate an estimated rotation angle using an output signal of the wave detector and output the estimated rotation angle to the AD converter.

Hereinafter, an angle detector and a motor controller according to an embodiment will be described with reference to FIGS. 1 to 15. The same components in each drawing are denoted by the same reference numeral, and overlapping description thereof is omitted.

FIG. 1 is a view showing a configuration example of a vehicle including the angle detector and the motor drive controller according to the embodiment.

A resolver digital convertor 10 is a digital circuit which detects a rotation angle of a rotation shaft of a motor 11, using a signal from a resolver 12. The rotation angle or a rotation angle position is referred to as a rotation angle of a resolver rotor 13 mounted around the rotation shaft of the motor 11.

A motor drive controller 14 has a cos phase coil 17 and a sin phase coil 18 as two-phase coils, the resolver digital convertor 10, and an inverter control portion 62 (controller). The motor drive controller 14 is an LSI (large scale integration) or a processor for obtaining a command value as a drive current value to the motor 11 to generate three-phase currents corresponding to the command value based on a resolver output signal, and, thus, to supply currents of the respective phases from corresponding three lines 15 to the motor 11.

The motor 11 is a brushless AC motor. The motor 11 is used for driving an electric power steering apparatus, for example.

The resolver 12 is a rotation angle sensor of the motor 11. The resolver 12 includes a resolver stator 16 fixed to a motor stator, the cos phase coil 17 and the sin phase coil 18 provided in the resolver stator 16, the resolver rotor 13 rotating with a motor rotor, and an excitation coil 19 provided in the resolver rotor 13.

The cos phase coil 17 and the sin phase coil 18 are arranged with a phase difference of 90 degrees from each other. The excitation coil 19 rotates with the motor rotor and the resolver rotor 13.

An excitation signal generator 20 generates an excitation signal and an excitation pulse signal. The excitation signal is referred to as an excitation signal sin ωt having a sinusoidal waveform. The excitation pulse signal is referred to as a signal converted from the excitation signal into a pulse signal line having the same repetition period as the period of the excitation signal. sin ωt is a time function representing $\sin(2\pi/T) \cdot t$. Here, π represents a circle ratio, T represents one cycle of the excitation signal, and t represents time. ωT is represented by deg or rad.

The excitation signal generator 20 has an exciter which outputs an excitation wave, an amplifier which amplifies the output of the exciter, and a comparator which limits an amplitude level of an amplified and output excitation wave. The excitation signal generator 20 inputs the excitation signal sin ωt output from the exciter to the excitation coil 19. The excitation signal generator 20 inputs the excitation signal output from the comparator to the resolver digital convertor 10.

The motor drive controller 14 includes an inverter control portion 62 which controls a switching inverter 60 (inverter circuit). The switching inverter 60 generates a driving current supplied to the motor 11. The switching inverter 60 has a plurality of switching elements which generate three-phase voltages supplied to the motor 11. The inverter control portion 62 ON/OFF-drives the switching elements of the switching inverter 60 based on the rotation angle and the command value calculated by the resolver digital convertor 10. A system of a vehicle includes a calculating portion 61 which obtains the command value of the motor drive current, a rudder angle sensor 63 for rudder torque, a torque sensor 64 for a rudder angle of a steering, and a vehicle speed sensor 65 for vehicle speed.

Figure 2:
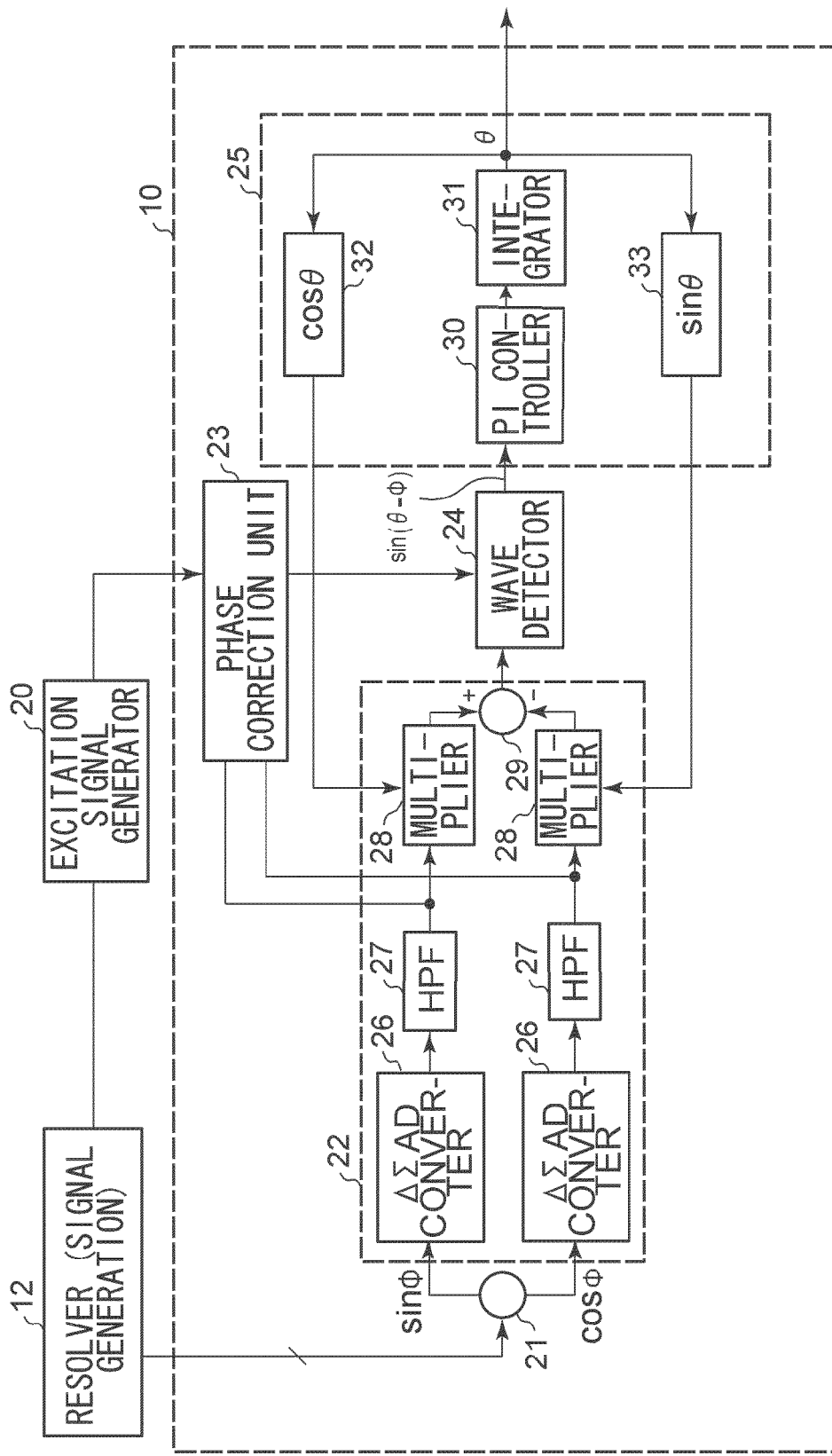
FIG. 2 is a block diagram of the angle detector according to the embodiment.

FIG. 2 is a block diagram of the resolver digital convertor 10. The same reference numerals as described above represent the same components.

The resolver digital convertor 10 receives two-phase resolver output signals generated by the resolver 12 from a port 21. The two-phase resolver output signals are referred to as a sin phase signal (a sine phase signal) sin φ and a cos phase signal (a cosine phase signal) cos φ having different phases by π/2 from each other. The sin phase signal sin φ is represented by sin ωt·sin θ from the sin phase coil 18. φ represents a time function, and θ represents the rotation angle of the motor 11 estimated by the resolver digital convertor 10. The cos phase signal cos θ is represented by sin ωt·cos θ from the cos phase coil 17.

Figure 3A:
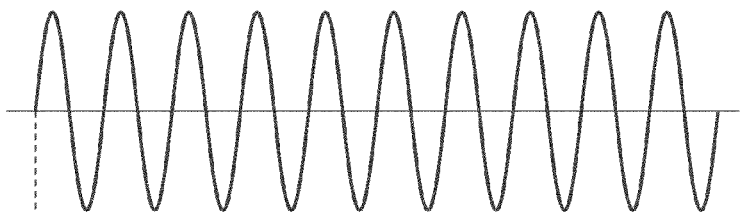
FIGS. 3A to 3D are views showing examples of waveforms of input and output of a resolver connected to the angle detector according to the embodiment.
Figure 3B:
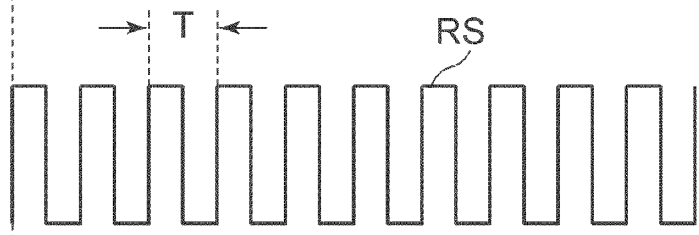
Figure 3C:
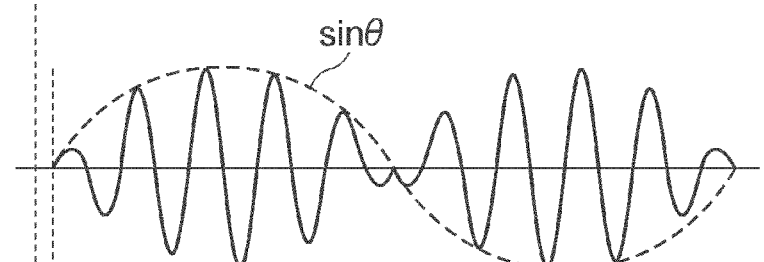
Figure 3D:
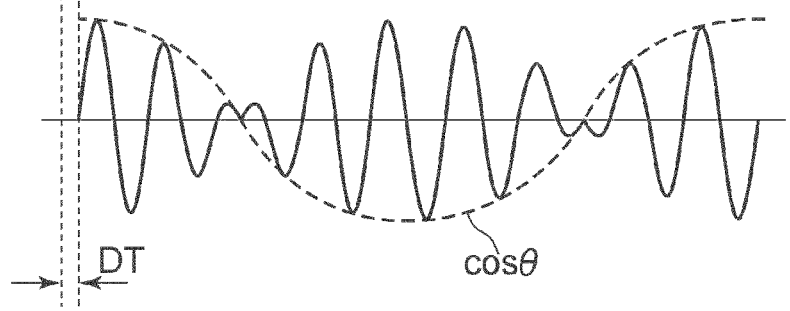

FIGS. 3A to 3D show examples of waveforms of input and output of the resolver 12. FIG. 3A is a view showing the waveform of the excitation signal sin ωt. The excitation signal sin ωt is an excitation wave having an excitation period T. FIG. 3B is a view showing the waveform of an excitation signal RS. The excitation signal RS has repetitive waveforms of a plurality of rectangular pulses. The excitation signal RS has the excitation period T. FIG. 3C is a view showing the waveform of the sin phase signal. FIG. 3D is a view showing the waveform of the cos phase signal.

The cos phase signal is obtained by amplitude-modulating the excitation signal sin ωt (excitation wave) by a rotation angle θ of the resolver rotor 13 (rotation shaft). An envelope of the amplitude of the cos phase signal varies sinusoidally over a longer period than the excitation period T.

The sin phase signal is similar to the example of the cos phase signal. The phase of the cos phase signal is delayed with respect to the phase of the excitation signal RS. The phase of the sin phase signal is delayed with respect to the phase of the excitation signal RS. DT represents a phase delay time.

The resolver digital convertor 10 of FIG. 2 includes an AD conversion section 22 (an AD converter) which AD-converts analog sin phase signal and an analog cos phase signal (plural-phase signal waves having respective different phases) and outputs a differential signal wave $\sin(\theta-\phi)\cdot\sin\omega t$ and a phase correction unit 23 (corrector) which is inputted the digital sin phase signal and the digital cos phase signal (converted plural-phase signal waves) from the AD conversion section 22 and delays the phase of the excitation signal RS input from the excitation signal generator 20.

The resolver digital convertor 10 further includes a wave detector 24 which perform synchronous detection to the differential signal wave $\sin(\theta-\phi)\cdot\sin\omega t$ from the AD conversion section 22 and an angle calculating section 25 (an angle calculator) which calculates the rotation angle θ (estimated rotation angle) with the differential signal wave from the detector 24. The rotation angle θ is referred to as estimated θ value data. The wave detection by the wave detector 24 is synchronized with the excitation signal RS whose phase is corrected by the phase correction unit 23. The angle calculating section 25 gives the rotation angle θ to the AD conversion section 22.

The AD conversion section 22 includes a first ΔΣ AD converter 26, a first HPF (high pass filter) 27, and a first multiplier 28. The first ΔΣ AD converter 26 converts the analog sin phase signal and outputs a discrete sin phase signal. The first HPF 27 passes a high-frequency component of a signal output from the ΔΣ AD converter 26. The first multiplier 28 multiplies the output signal from the HPF 27 and the rotation angle θ input from the angle calculating section 25.

The AD conversion section 22 includes a second ΔΣ AD converter 26, and a second HPF 27, and a second multiplier 28 for the analog cos phase signal. The AD conversion section 22 is further provided with a subtractor 29 which subtracts an output of the second multiplier 28 from an output of the first multiplier 28.

Figure 4A:
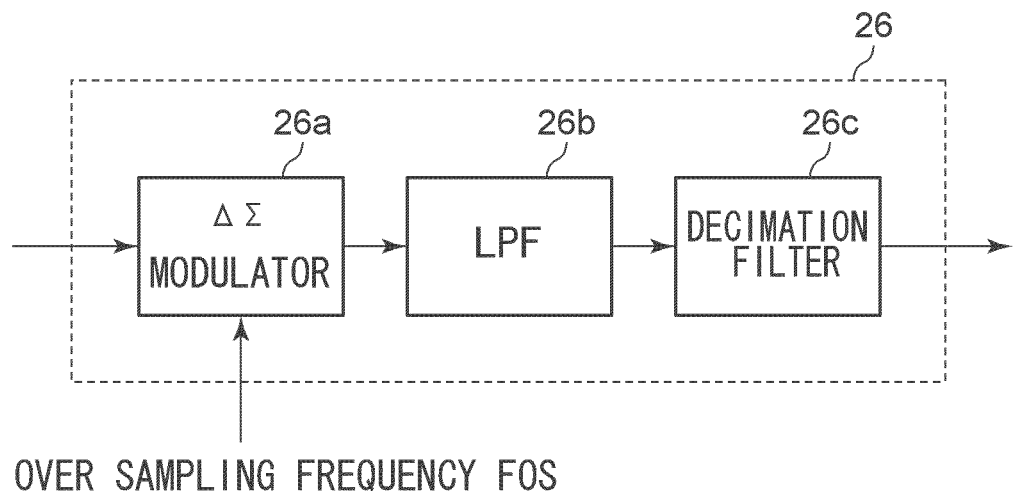
FIG. 4A is a view showing a configuration example in an AD converter of the angle detector according to the embodiment.

FIG. 4A is a block diagram of the first ΔΣ AD converter 26. The same reference numerals as described above represent the same components.

The ΔΣ AD converter 26 includes a ΔΣ modulator 26a which samples an analog signal with an over sampling frequency fos and outputs a pulse density modulation signal, an LPF (low pass filter) 26b which removes high-frequency noise included in an output of the ΔΣ modulator 26a, and a decimation filter 26c which thins output data of the LPF 26b and outputs obtained 16-bit data with a reference sampling frequency.

The ΔΣ AD converter 26 over-samples an analog signal and generates a digital signal having a necessary resolution. The ΔΣ AD converter 26 generates 16-bit data, for example. The configuration of the second ΔΣ AD converter 26 is the same as the configuration of the first ΔΣ AD converter 26.

The first HPF 27 of FIG. 2 is a signal differentiating circuit, for example. The first multiplier 28 multiplies sin φ by a cosine function value cos θ of the rotation angle θ. The first multiplier 28 outputs (sin θ·sin ωt)·cos φ.

The second HPF 27 has the same configuration as the first HPF 27. The second multiplier 28 multiplies cos φ by a sine function value sin φ of the rotation angle φ. The second multiplier 28 outputs (cos θ·sin ωt)·sin φ.

The subtractor 29 subtracts an output of the second multiplier 28 from the output of the first multiplier 28. The subtractor 29 outputs the differential signal wave sin(θ−φ)·sin ωt.

A physical calculation result for a signal obtained by the subtractor 29 is shown in a formula (I). The differential signal wave sin(θ−φ)·sin ωt has a waveform in which the excitation signal sin ωt is amplitude-modulated with the differential signal sin(θ−φ) between the rotation angle φ and the rotation angle θ.

$$(\sin θ·\sin ωt)·\cos φ−(\cos θ·\sin ωt)·\sin φ=(\sin θ·\cos φ−\cos θ·\sin φ)·\sin ωt=\sin(θ−φ)·\sin ωt \quad (I)$$

The phase correction unit 23 of FIG. 2 delays the phase of the excitation signal RS. The delay amount according to the phase correction unit 23 is DT (see, FIG. 3D). The delay amount DT is a phase delay (phase difference) between phases of two-phase signal waves and a phase of the excitation signal.

Figure 5:
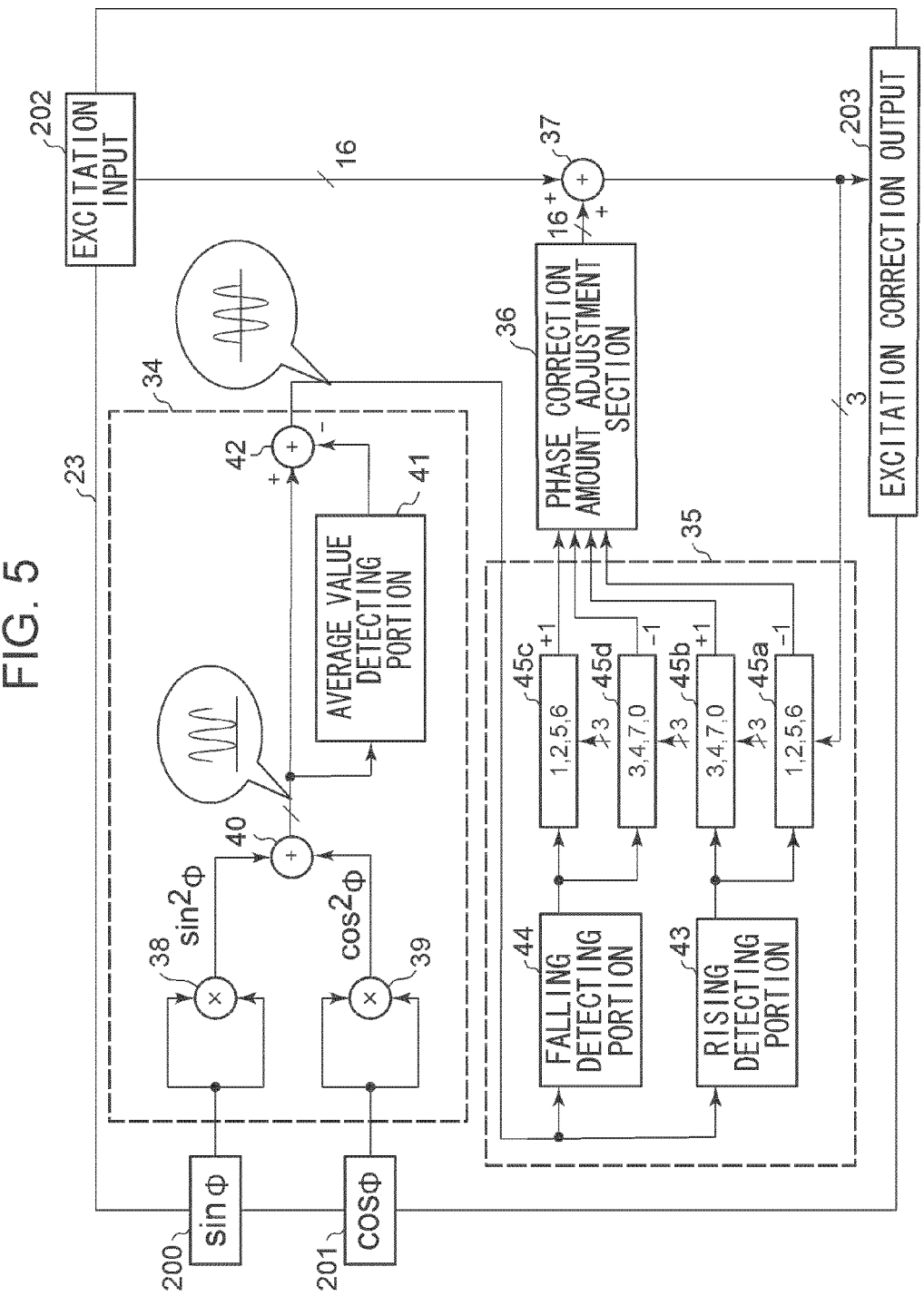
FIG. 5 is a block diagram of a corrector of the angle detector according to the embodiment.

FIG. 5 is a block diagram of the phase correction unit 23. The same reference numerals as described above represent the same components.

The phase correction unit 23 includes a square sum average calculator 34 which adds the square of the cos phase signal and the square of the sin phase signal to calculate a time average value of the adding result, and, thus, to output a square sum average signal having a period half the excitation period T and a zero-point detecting section 35 (a detector) which detects the phase of the square sum average signal in timing when the amplitude of the square sum average signal is 0 (reference level) and obtains a phase shift amount.

The phase shift amount is referred to as a shift amount between the phase at a zero-cross point of an ideal signal waveform and the phase at the zero-cross point of an actual input signal waveform. The phase shift amount is represented by a value in the one excitation period T of the square sum average signal, and the value is included within a range of −90 deg to +90 deg. The phase correction unit 23 outputs the square sum average signal with sixteen bits.

The phase correction unit 23 further includes a phase correction amount adjustment section 36 (a phase correction amount adjuster) which corrects the phase of the square sum average signal by the phase shift amount obtained by the zero-point detecting section 35 and ports 201, 202, 203, and 204. The phase correction unit 23 includes an adder 37 which adds phase correction amount information 0, +1, or −1 from the phase correction amount adjustment section 36 to the excitation signal RS of sixteen bits input from the port 202.

The square sum average calculating section 34 (a square sum average calculator) includes a multiplier 38 which squares the sin phase signal (sin θ·sin ωt) from the port 200, a multiplier 39 which squares the cos phase signal (cos θ·sin ωt) from the port 201, and an adder 40 which adds an output of the multiplier 38 and an output of the multiplier 39.

An output of the adder 40 is represented by sixteen bits. The value of a decimal number is always equal to or more than 0 (see, the output waveform of the adder 40 in FIG. 5). A physical calculation result for a signal obtained by the square sum average calculating section 34 is shown in a formula (II).

$$(\sin θ·\sin ωt)^2+(\cos θ·\sin ωt)^2=(\sin^2 θ+\cos^2 θ)·\sin^2 ωt=\sin^2 ωt=(1−\cos 2ωt)/2 \quad (II)$$

The square sum average calculating section 34 is further provided with an average value detecting section 41 which obtains a time average value of the output of the adder 40 and a subtractor 42 which subtracts an output of the average value detecting section 41 from the output of the adder 40.

Figure 6:
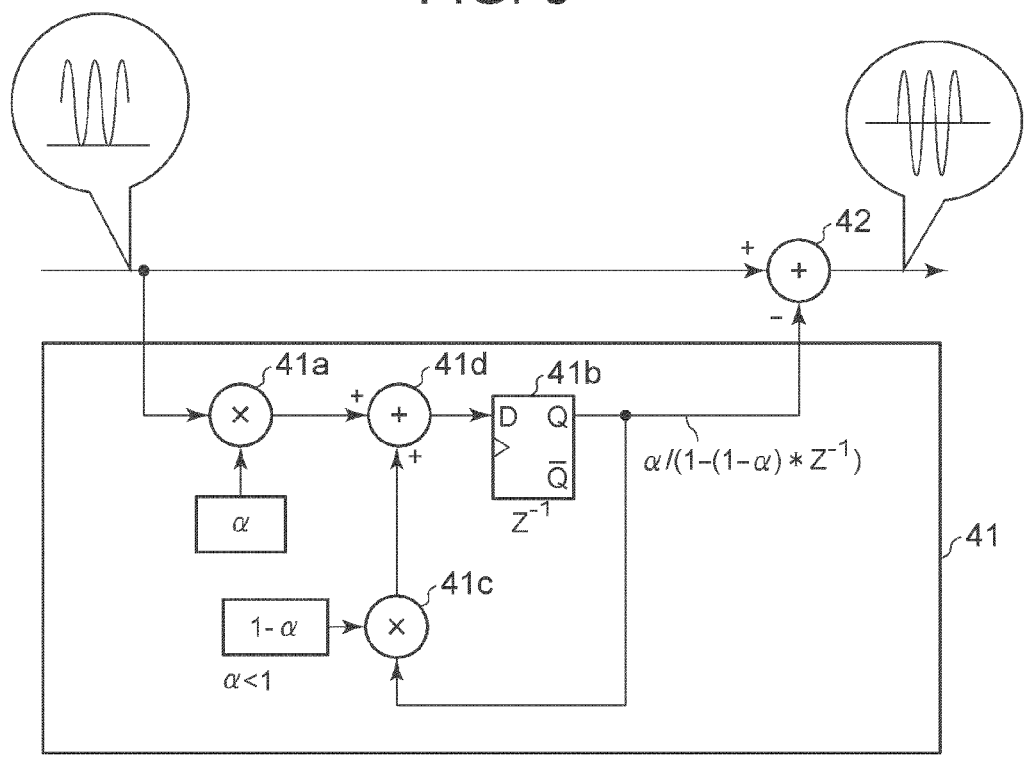
FIG. 6 is a block diagram of an average value detection section in a square sum average calculator used in the corrector of the angle detector according to the embodiment.

FIG. 6 is a block diagram of the average value detecting section 41. The same reference numerals as described above represent the same components. The average value detecting section 41 calculates a time average of the value represented by input 16-bit data. The average value detecting section 41 includes 16-bit multipliers 41a which each multiply an n-th 16-bit data by a parameter α and 16-bit flip-flops 41b (only the multiplier and the flop-flop corresponding to one bit are shown in FIG. 6). n represents natural number and corresponds to a sampling time, for example.

The average value detecting section 41 includes a multiplier 41c which multiplies an (n−1)th 16-bit data from the flip-flop 41b by a parameter (1−α) and an adder 41d which adds an output of the multiplier 41a and an output of the multiplier 41c. Parameters α and α−1 are values included within a range of 0 to 1.

In the processing by the average value detecting section 41, a designated amount of percentage of the (n−1)the 16-bit data is subtracted from the n-th 16-bit data by one sampling period. When the number of time of sampling increases, the average value detecting section 41 converges the input 16-bit data to an average value.

The square sum average calculating section 34 adds the square of the sin phase signal and the square of the cos phase signal and subtracts a time average value of the adding result from the adding result. The square sum average calculating section 34 outputs a square sum average signal (see, the output waveform of the square sum average calculating section 34 in FIG. 5) oscillated at a frequency twice the original frequency of the sin phase signal.

The average value detecting section 41 receives an initial value of the 16-bit data and thereafter continues to always add the average value of the amplitude of the square sum average signal. Alternatively, the average value detecting section 41 resets the average value of the amplitude of the square sum average signal for each designated time interval. The average value detecting section 41 may repeat the reset and restart of the adding.

The zero-point detecting section 35 of FIG. 5 detects a timing in which the amplitude of the square sum average signal zero-crosses. The square sum average signal has four zero-cross points in one excitation period T.

FIG. 7D shows an example of the waveform of the square sum average signal in an ideal state. A square sum average signal 53 has three zero-cross points 55, 56, 57, and 58. The zero-point detecting section 35 uses as reference phases four phases at the zero-cross points 55 to 58 of the square sum average signal 53 in the ideal state. The phase shift amount is 0 in the ideal state.

FIG. 8D shows the square sum average signal 53 having a phase more delayed than a reference phase of FIG. 7D. FIG. 9D shows the square sum average signal 53 having a phase more advanced than the reference phase of FIG. 7D.

In FIG. 7D, the initial zero-cross point 55 of the square sum average signal 53 is located on a boundary between phase intervals 0 and 1. In FIG. 8D, the zero-cross point 55 is located on a boundary between the phase interval 1 and 2. In FIG. 9D, the zero-cross point 55 is located on a boundary between the phase interval 7 and 0.

As shown in FIG. 8D, the zero-cross point 55 to appear on the boundary between the phase intervals 0 and 1 appears at a position delayed by one interval width. As shown in FIG. 9D, the zero-cross point 55 to normally appear on the boundary between the phase intervals 0 and 1 appears at a position advanced by one interval width.

In the processing by the zero-point detecting section 35, the phase of the square sum average signal 53 at the zero-cross point 55 is detected. The zero-point detecting section 35 obtains the phase shift amount from a reference position (reference phase position of the phase in the excitation period T) on the boundary between the phase intervals 0 and 1, for example based on a well-known reference phase timing of an excitation sawtooth wave signal 50 (excitation signal).

The zero-point detecting section 35 determines, with regard to an input signal waveform, delay or advance of a detected phase from the boundary between the phase intervals 0 and 1. Based on the determination result, the zero-point detecting section 35 generates correction direction information showing a direction in which a delayed phase is accelerated or a direction in which the advanced phase is returned to its original state and correction amount information.

The processing by the zero-point detecting section 35 for the zero-cross points 56, 57, and 58 is substantially the same as the example of the zero-cross point 55.

The configuration of the zero-point detecting section 35 will be described. Returning to FIG. 5, the zero-point detecting section 35 includes a rising detecting section 43 which detects a rising timing in which a signal waveform crosses the zero level during rising and a falling detecting section 44 which detects a falling timing in which the signal wave crosses the zero level during falling. The signal waveform is referred to as the waveform of the square sum average signal 53.

FIG. 10A is a view showing a configuration example of the rising detecting section 43. A comparator 59, for example, is used in the rising detecting section 43. The comparator 59 has two input terminals, for example. One of the input terminals is grounded to a potential 0.

FIG. 10B is a view showing the waveform of the square sum average signal 53 input to the comparator 59. The square sum average signal 53 is input to the comparator 59 through the other input terminal.

FIG. 10C is a view showing an output signal example of the comparator 59. The timing of zero-cross detection by the rising detecting section 43 corresponds to a positive edge clock of a signal from Low to High.

The configuration of the falling detecting section 44 is substantially the same as the configuration of the rising detecting section 43. The timing of zero-cross detection by the falling detecting section 44 corresponds to a negative edge clock of a signal from High to Low. The operation start timing of the falling detecting section 44 is different from the operation start timing of the rising detecting section 43.

In FIG. 5, the zero-point detecting section 35 includes two phase correction direction output portions 45a and 45b (phase correction direction outputters) on the output side of the rising detecting section 43 and two phase correction direction output portions 45c and 45d on the output side of the falling detecting section 44 (reference numerals 1, 2, 5, and 6 and 3, 4, 7, and 0 will be described later).

Figure 11:
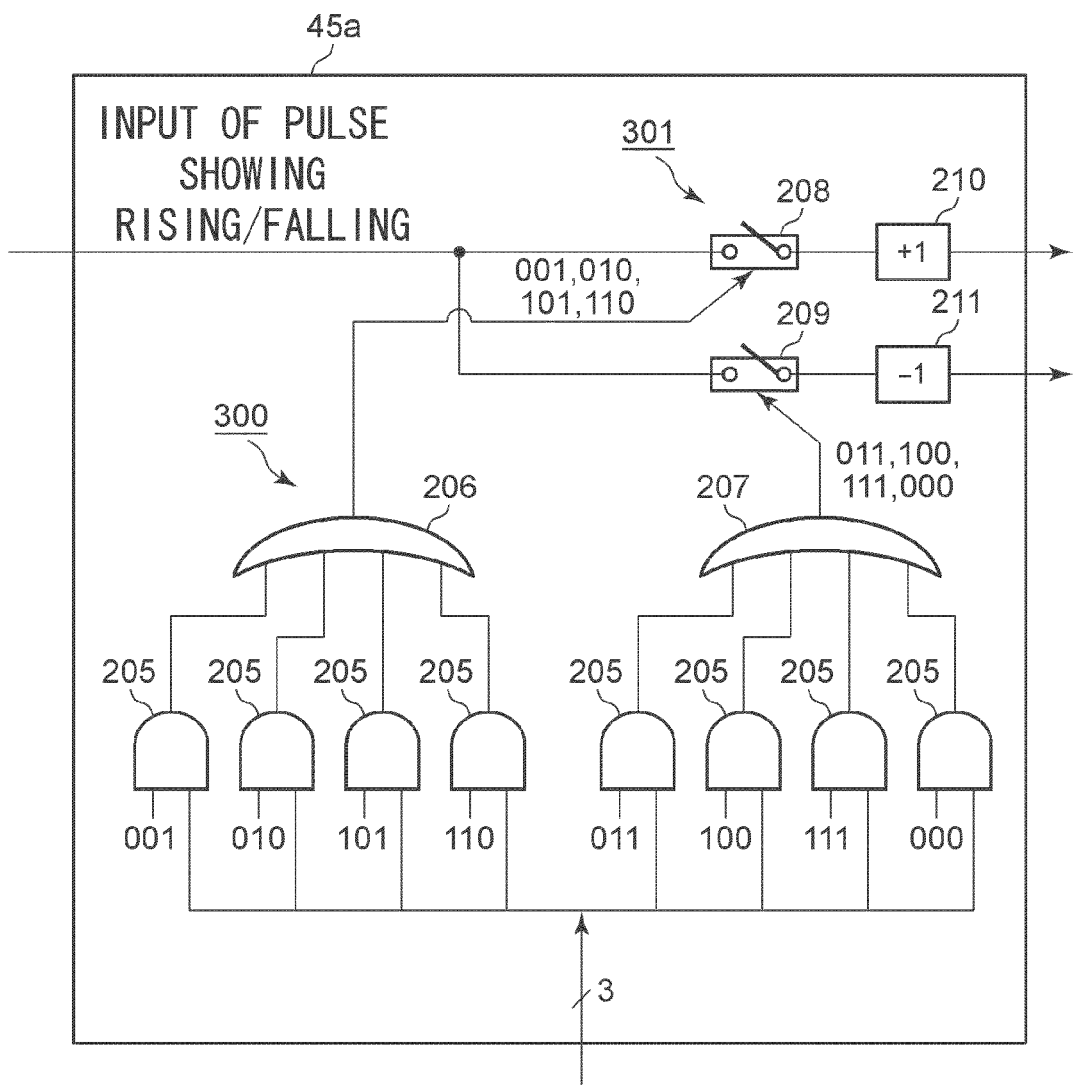
FIG. 11 is a block diagram of a phase correction direction outputter in the detector used in the corrector of the angle detector according to the embodiment.

FIG. 11 is a block diagram of the phase correction direction output portion 45a. The same reference numerals as described above represent the same components.

The phase correction direction output portion 45a outputs a phase shift correction direction according to interval numbers (numbers) 0, 1, 2, 3, 4, 5, 6, and 7 of the phase intervals obtained by dividing one excitation period T into eight intervals and reference phase positions representing positions of a zero-cross phase in an ideal state.

The correction direction is referred to as a plus direction in which the phase is advanced and a minus direction in which the phase is returned. The interval numbers 0 to 7 are the eight numbered phase intervals obtained by dividing the excitation period T. The interval numbers 0 to 7 represent whether the zero-cross phase of the square sum average signal in the rising timing belongs to any of the eight phase intervals.

The phase correction direction output portion 45a is provided with a sorting section 300 (a sorter) which determines the interval number of the zero-cross phase in the rising timing according to a digital amplitude level of a digital excitation signal 51 and an output portion 301 (an outputter) which outputs the correction direction and the phase shift correction amount according to rising or falling detection pulse, the interval numbers 0 to 7, and the reference phase position. The excitation signal 51 (FIG. 7B) after AD conversion is represented by sixteen bits.

When arbitrary zero cross occurs, the phase correction direction output portion 45a obtains whether the phase at the zero-cross point of the square sum average signal is located in any of the phase intervals 0 to 7 or located on a boundary between adjacent phase intervals. After the phase correction direction output portion 45a obtains the phase position, the phase correction direction output portion 45a obtains the phase correction direction and the correction amount.

FIG. 7A is a time chart of an excitation sawtooth wave, in which each phase is located at the reference phase position. The excitation sawtooth wave signal 50 in FIG. 7A corresponds to the output of the port 202 in FIG. 5. The excitation period T is assumed to be (1/10 kHz) seconds. The excitation sawtooth wave signal 50 is an original waveform for phase shift amount extraction processing.

FIG. 7B is a time chart of an excitation sawtooth wave after adjustment of a phase in an ideal state. An excitation sawtooth wave 51 in FIG. 7B corresponds to the output of the port 203.

FIG. 7C is a time chart of a sin phase signal after AD conversion by the AD conversion section 22 in an ideal state. FIG. 7C shows the sin phase signal in the port 200.

FIG. 7D is a time chart of the square sum average signal in an ideal state. The frequency of the square sum average signal 53 is twice the frequency of a sin phase signal 52. In FIGS. 7A to 7D, the time charts share the same time axis.

The excitation sawtooth wave signal 50 has a value in a range from the bottom value 0x0000 to the top value 0xffff. 0x represents a hexadecimal number. A value of the excitation sawtooth wave signal 50 at a point 54 is 0x4000.

FIGS. 8A to 8D show a relationship between a waveform and a phase when the phase of the square sum average signal 53 whose phase is delayed is corrected.

FIG. 8A is a time chart of the excitation sawtooth wave signal 50 whose phase is delayed. FIG. 8B is a time chart of the excitation sawtooth wave 51 in a phase delay state. FIG. 8C is a time chart of the sin phase signal 52 in a phase delay state. FIG. 8D is a time chart of the square sum average signal 53 in the phase delay state.

FIGS. 9A to 9D show a relationship between a waveform and a phase when the phase of the square sum average signal 53 whose phase is advanced is corrected.

FIG. 9A is a time chart of the excitation sawtooth wave signal 50 whose phase is advanced. FIG. 9B is a time chart of the excitation sawtooth wave 51 in a phase advance state. FIG. 9C is a time chart of the sin phase signal 52 in the phase advance state. FIG. 9D is a time chart of the square sum average signal 53 in the phase advance state.

The same reference numerals in FIGS. 7A to 9D represent substantially equivalent elements.

The phase correction direction output portion 45a obtains a phase of a signal waveform at the time of zero cross of the square sum average signal 53 according to the top three bits of a 16-bit data feedback-input from the adder 37.

As shown in FIG. 8D showing delay, when the initial rising zero-cross point 55 is located on the boundary between the phase intervals 1 and 2 in the period T, the phase correction direction output portion 45a advances the phase of the excitation signal 51 after AD conversion. The amount of advancing the 16-bit phase data according to the phase correction direction output portion 45a corresponds to one sampling rate. The one sampling rate means a sampling time width satisfactorily shorter than a time length corresponds one interval width. Data in one sampling time is shifted at the one sampling rate. By repeating plural times of shifting, the phase correction direction output portion 45a moves data of the excitation signal 51 by one interval to the right, as shown in FIG. 8B.

As shown in FIG. 9D showing advance, when the initial rising zero-cross point 55 is located on the boundary between the phase intervals 7 and 0 in the period T, the phase correction direction output portion 45a delays the phase of the excitation signal 51 after AD conversion by one interval. The phase correction direction output portion 45a delays the 16-bit phase data for each amount corresponding to the one sampling rate. By repeating plural times of shifting, the phase correction direction output portion 45a moves data of the excitation signal 51 by one interval to the left, as shown in FIG. 9B.

The maximum phase shift amount that can be corrected by the phase correction direction output portion 45a is an amount corresponding to a width of two intervals. The two interval widths correspond to a phase 90 deg of the square sum average signal 53. The phase correction direction output portion 45a corrects a delay of the signal waveform of FIG. 7D corresponding to the two interval widths. Or the phase correction direction output portion 45a corrects an advance of the signal waveform corresponding to the two interval widths. Even if the zero-cross point 55 on the boundary between the phase interval 0 and 1 in FIG. 7D shifts to immediately before the end in the phase interval 2 in FIG. 7D, the phase correction direction output portion 45a corrects the shift amount.

The sorting section 300 of FIG. 11 is provided with eight AND gates 205 and OR gates 206 and 207. The eight AND gates 205 each receive an input of three bits common between the AND gates 205. Three bits are referred to as the top three bits of sixteen bits. Sixteen bits represent a range from 32767 to −32768 for the amplitude of the excitation signal 51 after AD conversion.

The eight AND gates 205 receive an input of three bit pattern data different from each other. The phase correction direction output portion 45a stores the three bit pattern data beforehand. The output portion 301 is provided with a switch 208 which closes a circuit by information of a detection pulse and turning on of the OR gate 206, a switch 209 which closes a circuit by the information of the detection pulse and turning on of the OR gate 207, a calculator 210 which outputs a signal representing "plus one", and a calculator 211 which outputs a signal representing "minus one".

The phase correction direction output portions 45b, 45c, and 45d have substantially the same configuration of the phase correction direction output portion 45a.

In the phase correction direction output portions 45a to 45d, the phase correction direction output portions 45a and 45b receive a notification of a rising detection pulse from the rising detecting section 43. The phase correction direction output portions 45c and 45d receive a notification of a falling detection pulse from the falling detecting section 44.

The first phase correction direction output portion 45a is used for correcting the phase of the square sum average signal 53 in which the detection phase at a rising zero-cross point appears in the phase intervals 1 and 2 (see, FIG. 8D). As shown in FIG. 8D, the square sum average signal 53 has two rising detection points (zero-cross points 55 and 57) in the one excitation period T. The phase correction direction output portion 45a corrects the phase shift amount at the former zero-cross point 55 to correct both the phase shift at the zero-cross point 55 in the former phase intervals 1 and 2 and the phase shift at the zero-cross point 57 in the latter phase intervals 5 and 6.

The second phase correction direction output portion 45b is used for correcting the phase of the square sum average signal 53 in which the detection phase at the rising zero-cross point appears in the phase intervals 7 and 0 (see, FIG. 9D). As shown in FIG. 9D, the square sum average signal 53 has the two rising detection points (zero-cross points 55 and 57) in the one excitation period T. The phase correction direction output portion 45b corrects the phase shift amount at the former zero-cross point 55 to correct both the phase shift at the zero-cross point 55 in the former phase intervals 7 and 0 and the phase shift at the zero-cross point 57 in the latter the phase intervals 3 and 4.

Similarly, the third phase correction direction output portion 45d is used for correcting the phase of the square sum average signal 53 in which the detection phase at the falling zero-cross point appears in the phase intervals 3 and 4 (see, FIG. 8D). As shown in FIG. 8D, the square sum average signal 53 has two falling detection points (zero-cross points 56 and 58) in the one excitation period T. The phase correction direction output portion 45d corrects the phase shift amount at the former zero-cross point 56 to correct both the phase shift at the zero-cross point 56 in the former phase intervals 3 and 4 and the phase shift at the zero-cross point 58 in the latter phase intervals 7 and 0.

The fourth phase correction direction output portion 45c is used for correcting the phase of the square sum average signal 53 in which the detection phase at a falling zero-cross point appears in the phase intervals 1 and 2 (see, FIG. 9D). As shown in FIG. 9D, the square sum average signal 53 has the two rising detection points (zero-cross points 56 and 58) in the one excitation period T. The phase correction direction output portion 45c corrects the phase shift amount at the former zero-cross point 56 to correct both the phase shift at the zero-cross point 56 in the former phase intervals 1 and 2 and the phase shift at the zero-cross point 58 in the latter phase intervals 5 and 6.

The phase correction direction output portion 45a, 45b, 45c, and 45d notify a command showing the phase correction direction to the phase correction amount adjustment section 36 according to the detection pulse (detection information) that distinguishes rising and falling and the phase position of the rising or falling zero-cross point.

Figure 12:
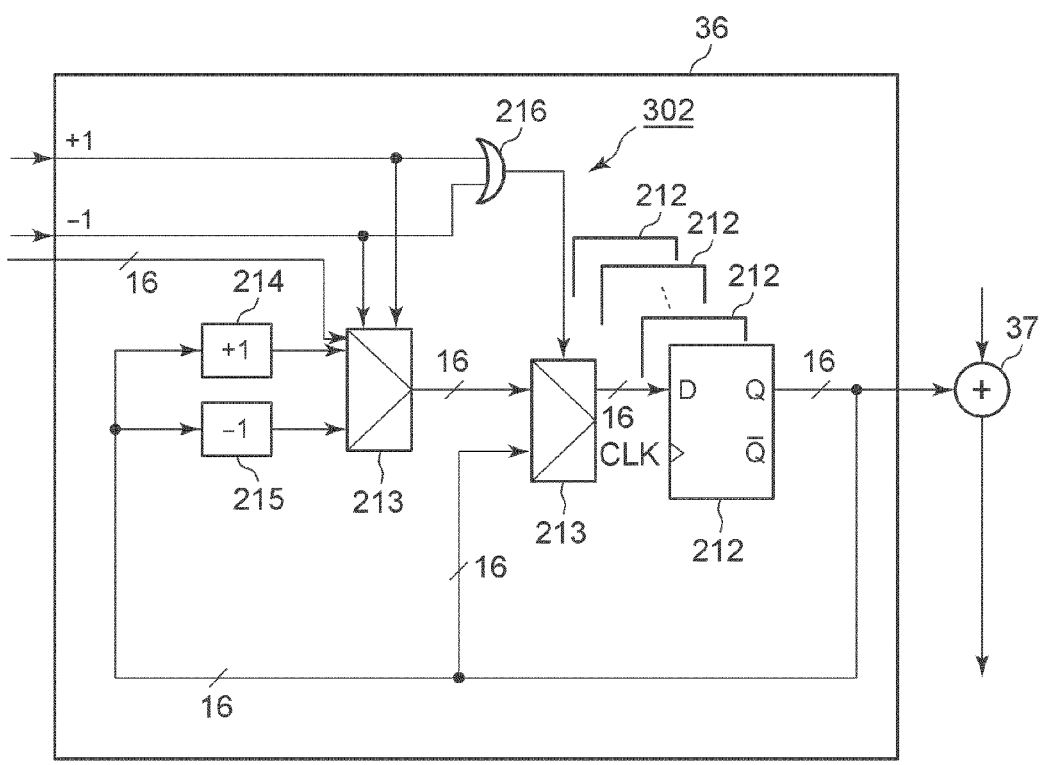
FIG. 12 is a block diagram of a phase correction amount adjuster used in the corrector of the angle detector according to the embodiment.

FIG. 12 is a block diagram of the phase correction amount adjustment section 36. The same reference numerals as described above represent the same components. The phase correction amount adjustment section 36 includes sixteen flip-flops 212 (delay elements) corresponding to sixteen bits representing the amplitude level of the excitation signal RS, a selection section 302 (a selector) on the input side, and an arithmetic circuit 213 on the preceding stage side of each of the flip-flops 212. The selection section 302 switches between advancing the phase of the square sum average signal 53, returning the phase, and allowing passage of the square sum average signal 53 according to the correction direction and the correction amount of the phase shift. The selection section 302 includes an OR gate 216, a calculator 214 which outputs a signal representing "plus 1", a calculator 215 which outputs a signal representing "minus 1", and an arithmetic circuit 216. The arithmetic circuit 213 executes holding of a value of the 16-bit flip-flop 212, increment of each value, or decrement of each value according to the selection by the selection section 302.

Returning to FIG. 2, the angle calculating section 25 includes an angular velocity calculating portion (PI [proportion integration] controller) 30 which calculates the angular velocity of the motor 11, a rotation angle calculating portion (integrator) 31 which integrates the angular velocity from the angular velocity calculating portion 30 and calculates the rotation angle θ of the motor 11, a COS table 32 which outputs the cosine function value cos θ corresponding to the rotation angle θ from the integrator 31 to the first multiplier 28, and a SIN table 33 which outputs the sine function value sin θ corresponding to the rotation angle θ to the second multiplier 28.

Figure 4B:
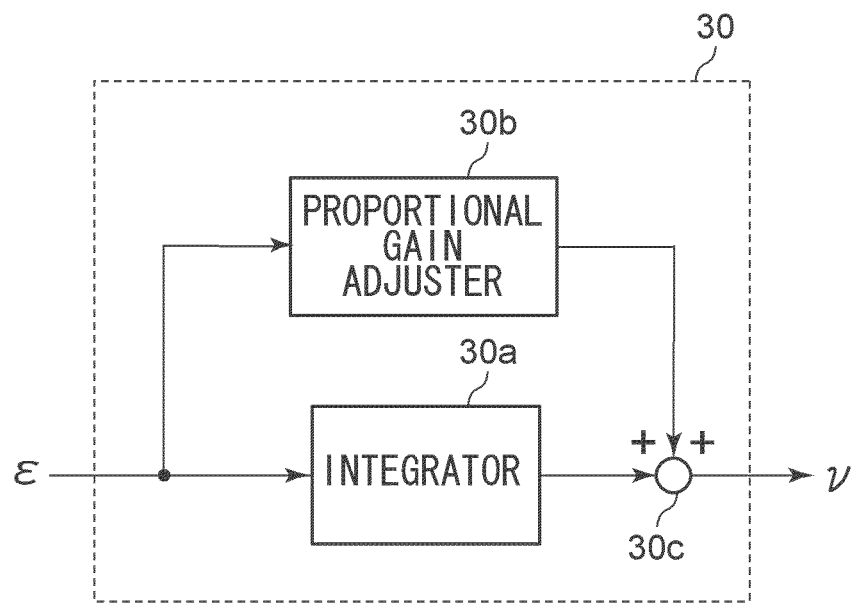
FIG. 4B is a view showing a configuration example in an angle calculator of the angle detector.

FIG. 4B is a block diagram of the angular velocity calculating portion 30. The angular velocity calculating portion 30 includes an integrator 30a which integrates a control error ε from the wave detector 24 and calculates the angular velocity of the motor 11, a proportional gain adjuster 30b for inserting a feedback gain of a proportional element into an output of the integrator 30a, and an adder 30c which adds an output of the proportional gain adjuster 30b to the output of the integrator 30a. The calculation by the angular velocity calculating portion 30 is PI (proportion+integration) control using the adjustment of the proportional gain and phase compensation according to the integrator 30a.

In a system of a vehicle having the resolver digital convertor 10 (FIG. 1) having the above constitution, information is gathered from a torque sensor 64 and so on by the calculating portion 61. The inverter control portion 62 generates a three-phase PWM (pulse width modulation) control voltage signal having a pulse width corresponding to a target voltage of an input to the motor 11 and outputs each voltage signal to the switching inverter 60. The switching inverter 60 generates three-phase AC driving currents corresponding to each PWM control voltage signal and supplies each generated current to the motor 11. The three-phase AC driving current is referred to as a sinusoidal current. A motor rotation shaft rotates.

In the system, the excitation signal generator 20 adds the excitation pulse signal to the resolver digital convertor 10. The excitation signal generator 20 adds an excitation signal to the resolver 12. The excitation coil 19 rotates with the rotation of the resolver rotor 13. A positional relationship between the resolver rotor 13 and the resolver stator 16 is changed by axial rotation. A magnetic field is induced. The resolver 12 causes phase delay of an excitation signal by its own operation. Signal transfer between the resolver 12 and the resolver digital convertor 10 causes the phase delay.

The two ΔΣ AD converters 26 of the AD conversion section 22 over-samples the sin phase signal and the cos phase signal. A bit number of an output of the ΔΣ AD converter 26 depends on a decimation ratio. The decimation ratio is referred to as a ratio between an oversampling rate of the decimation filter 26c and a predetermined sampling rate. The decimation ratio is sixteen. The two HPFs 27 result in distorting the waveform of the output signal of each of the ΔΣ AD converters 26.

Figure 13:
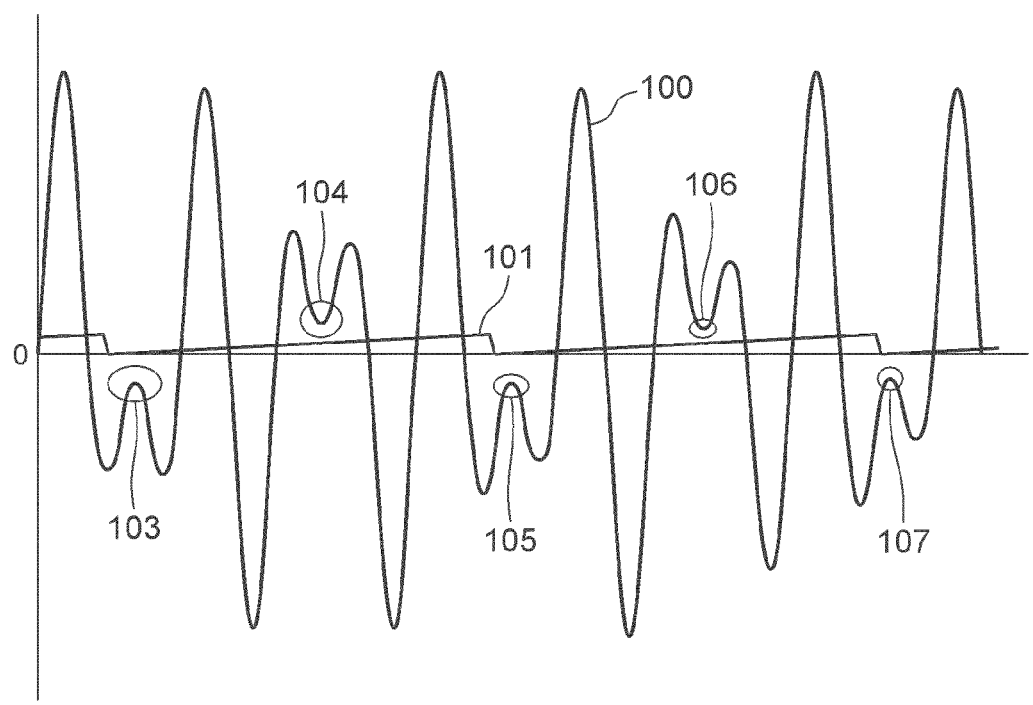
FIG. 13 is a view showing an output waveform example of an AD converter of an angle detector according to the embodiment.

FIG. 13 is a view showing an output waveform example of an AD conversion section 22. FIG. 13 shows results obtained by simulation by the present inventor. A waveform 100 of FIG. 13 shows a digital sin phase signal or a digital cos phase signal. A horizontal axis represents time, and a vertical axis represents deg. A waveform 101 represents a motor rotation angle. Conditions include that the rotation frequency of the motor 11 is 2500 Hz and a frequency of an excitation signal is 10 kHz. With regard to the shape of the waveform 100, the waveform 100 has a substantial left-right symmetry with respect to a vertical line passing through a point 105. The waveform 100 has points 103, 104, 105, 106, and 107 that do not cross zero. The two HPFs 27 distort the waveform.

In the processing by the resolver digital convertor 10, the phase of the square sum average signal is corrected so that the waveform 100 zero-crosses at a zero-cross point through which the waveform 100 is to be passed.

In the resolver 12, in terms of operating principle, a signal from the AD conversion section 22 is represented by a formula (III).

SIN phase side . . . $K \cdot ext(t) \cdot \sin(\phi)$

COS phase side . . . $K \cdot ext(t) \cdot \cos(\phi)$ (III), where K represents a coefficient of a path on the way, ext(t) represents an excitation signal, and φ represents the rotation angle of a motor shaft. When each square sum of them is calculated, the square of the excitation signal is obtained as shown in a formula (IV).

$$[K \cdot ext(t) \cdot \sin(\phi)]^2 + [K \cdot ext(t) \cdot \cos(\phi)]^2 = K^2 \cdot ext(t)^2 \quad (IV)$$

The resolver digital convertor 10 subtracts an average value of a signal represented by the formula (IV) from the signal. The resolver digital convertor 10 adjusts the phase by matching the zero-cross point of a signal obtained by subtraction and the phase of excitation to be described in detail hereinafter.

In FIG. 5, the phase correction unit 23 receives an input of the excitation signal RS from the port 202. The phase correction unit 23 receives inputs of the sin phase signal and the cos phase signal from the ports 201 and 202. The zero-point detecting section 35 receives the input of the square sum average signal from the phase correction unit 23. The zero-point detecting section 35 receives inputs of the top three bits of 16-bit amplitude data of the excitation signal 51 after AD conversion from the adder 37.

Unlike an ideal state, the zero-point detecting section 35 receives the square sum average signal whose phase is shifted. The rising zero cross of the square sum average signal input to the zero-point detecting section 35 is first detected by the rising detecting section 43. After start of operation of the rising detecting section 43, the operation of the falling detecting section 44 starts. The rising zero cross of the square sum average signal is first detected by the rising detecting section 43, and then the falling zero cross is detected by the falling detecting section 44.

The rising detecting section 43 detects an unknown rising zero-cross point. The rising detecting section 43 notifies a detection pulse showing the detection of the rising zero cross to the phase correction direction output portions 45a and 45b. The input of the detection pulse triggers that the phase correction direction output portions 45a and 45b refers to the same top three bit data. The phase correction direction output portion 45a and 45b extract whether the phase position of the zero-cross point is located in any of the phase intervals 0 to 7 or located on any of the boundaries between the phase intervals.

When the three bit pattern is any one of 001, 010, 101, and 110, the zero-cross point is located in any one of the interval numbers 1, 2, 5, and 6, and the phase correction direction output portion 45*a* distinguishes delay. The switch 208 closes a circuit according to the rising information shown by the detection pulse and turning on of the OR gate 206. The phase correction direction output portion 45*a* outputs a command for advancing the phase with a 16-bit square sum average signal. When the phase correction direction output portion 45*a* detects the former zero-cross point, the phase correction direction output portion 45*a* outputs the command for advancing the phase with the square sum average signal in the detection timing at the latter zero-cross point.

When the three bit pattern is any one of 011, 100, 111, and 000, the zero-cross point is located in any one of the interval numbers 3, 4, 7, and 0, and the phase correction direction output portion 45*b* distinguishes advance. The switch 209 closes a circuit according to the rising information shown by the detection pulse and turning on of the OR gate 207. The phase correction direction output portion 45*a* outputs a command for delaying the phase with the 16-bit square sum average signal. When the phase correction direction output portion 45*b* detects the former zero-cross point, the phase correction direction output portion 45*b* outputs a command for delaying the phase with the square sum average signal in a detection timing at the latter zero-cross point.

As in the example of rising, when the falling detecting section 44 detects an unknown falling zero-cross point, the falling detecting section 44 notifies a detection pulse showing falling to the phase correction direction output portions 45*c* and 45*d*. The phase correction direction output portions 45*c* and 45*d* refer to the top three bit data.

When the three bit pattern is any one of 001, 010, 101, and 110, the zero-cross point is located in any one of the interval numbers 1, 2, 5, and 6, and the phase correction direction output portion 45*c* distinguishes advance. The phase correction direction output portion 45*c* outputs a command for delaying the phase with the square sum average signal. When the phase correction direction output portion 45*c* detects the former zero-cross point, the phase correction direction output portion 45*c* outputs the command for delaying the phase with the square sum average signal in the detection timing at the latter zero-cross point.

When the three bit pattern is any one of 011, 100, 111, and 000, the zero-cross point is located in any one of the interval numbers 3, 4, 7, and 0, and the phase correction direction output portion 45*d* distinguishes delay. The phase correction direction output portion 45*d* outputs the command for advancing the phase with the square sum average signal. When the phase correction direction output portion 45*d* detects the former zero-cross point, the phase correction direction output portion 45*d* outputs the command for advancing the phase with the square sum average signal in the detection timing of the latter zero-cross point.

The 16-bit data according to the phase correction direction output portions 45*a* to 45*d* is shifted in high-speed sampling time such as 4 µ-seconds. The zero-point detecting section 35 is operated at a sampling rate having a satisfactory shorter time in comparison with the time width of one phase interval. The phase correction direction output portions 45*a* to 45*d* output, at the sampling rate, a command signal for advancing or delaying the phase.

The phase correction amount adjustment section 36 performs +1 or −1 processing with respect to the 16-bit data corresponding to one interval width during a sampling interval. The 16-bit data output at the sampling rate by the phase correction amount adjustment section 36 moves to the adder 37 at the same sampling rate. The 16-bit data from the adder 37 is input to the zero-point detecting section 35 at the sampling rate. The phase correction amount adjustment section 36 repeats correction corresponding to the amounts +1 and −1 for each sampling interval.

The zero-point detecting section 35, the phase correction amount adjustment section 36, and the adder 37 continue processing in a loop formed by the above by plural times of sampling. Consequently, the phase correction corresponding to the time length of one phase interval is completed. The phase amount corresponding to up to two phase intervals is delayed or advanced. If the phase with the amount corresponding to the time length of one phase interval is correctively corrected, an unexpected jump of a value occurs due to an influence of noise. The phase correction amount adjustment section 36 executes plural times of loop processing and shifts the phase by a small amount. By the execution of the loop processing, the phase of the square sum average signal approaches the ideal state.

When rising or falling is detected, the phase is corrected by the interval number of the detected phase. The phase of the excitation signal at the extracted zero-cross point is detected, and the correction direction of the square sum average signal is obtained according to the detected phase. The loop processing is repeatedly executed, whereby the excitation signal having a phase with the shift amount having a value in a range from 90 degrees to −90 degrees is suitably corrected in the correction amount. The shift of the phase of the excitation signal is adjusted.

In a conventional example, when the integral multiple of the excitation period T and the rotation period of the motor 11 approach each other, there is a technical problem that the waveform after AD conversion does not always pass through "0" point. As a result, the correction value is deviated, so that error of the angle detection value may be increased. According to the resolver digital convertor 10 and the motor drive controller 14, the phase of the square sum of the input signal and the phase of the excitation signal are adjusted. By the adjustment, the error of the angle detection value is eliminated. And the technical problem is overcome.

For example, when the excitation period (1/10 kHz) is four times the rotation period of the motor 11 (1/2.5 kHz), the digital sin phase signal and the digital cos signal are distorted by the HPF 27, as shown in FIG. 13. The phase correction using the digital sin phase signal and the digital cos signal is less accurate. According to the angle detector and the motor drive controller according to the embodiment, the digital sin phase signal and the digital cos phase signal are squared, and the zero-cross point of the square sum average signal is used; therefore, the accuracy is enhanced.

(Variation)

The angle detector and the motor drive controller according to the embodiment may use a zero-cross point detecting section instead of the zero-point detecting section 35. An angle detector and a motor drive controller according to the variation have the substantially same configurations of the resolver digital convertor 10 and the motor drive controller 14, respectively, unless otherwise specified.

Figure 14A:
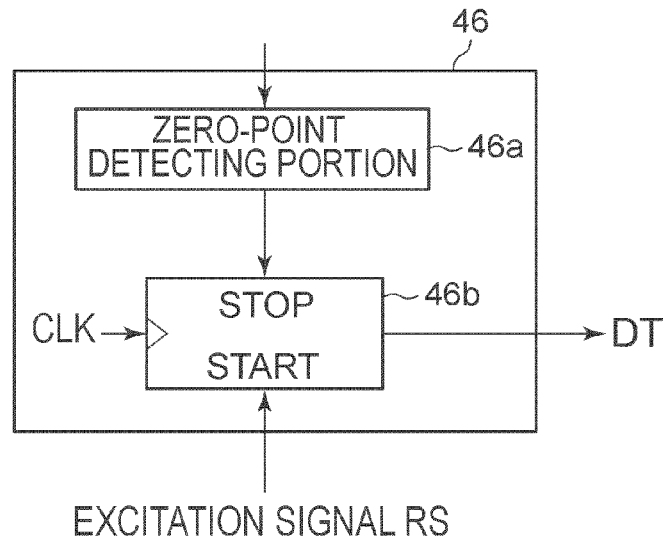
FIGS. 14A to 14E are views for explaining a detector used in a corrector of an angle detector according to a variation of the embodiment.

FIG. 14A is a block diagram of a detecting section used in the angle detector according to the variation. The same reference numerals as described above represent the same components.

A phase delay time measurement section 46 (detecting section) measures a phase delay time DT. The phase delay time measurement section 46 detects the phase of the square sum average signal at the zero cross timing, and the phase shift amount is obtained.

As shown in FIGS. 5 and 14A, the phase delay time measurement section 46 includes another zero-point detecting section 46a which detects the zero-cross point of the square sum average signal from an output of the adder 40 (FIG. 5) and a counter 46b which receives an input of a detection signal from the zero-point detecting section 46a and the input of the excitation signal RS from the port 202 (FIG. 5). The phase delay time measurement section 46 starts counting by a counter 46b from a timing of rising of the excitation signal RS. The phase delay time measurement section 46 stops the counter 46b from counting by a detection signal in the rising timing or a detection signal in the falling timing.

Figure 14B:
Figure 14C:
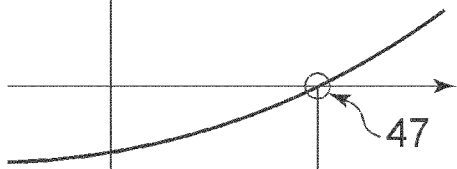
Figure 14D:
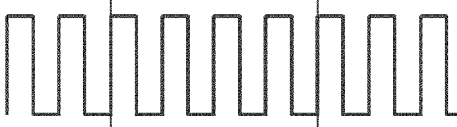
Figure 14E:
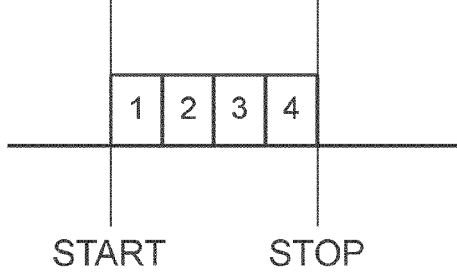

FIG. 14B is a time chart of the excitation signal RS. FIG. 14C is a time chart of the square sum average signal wave form. FIG. 14D is a time chart of an operation clock of the counter 46b. FIG. 14E is a time chart of a value of the counter 46b. The same reference numerals as described above represent the same components.

An initial value of the counter 46b is assumed to be 0x0000. The counter 46b starts counting by rising of the excitation signal RS. The counter 46b continues to increase a value by a clock input. The counter 46b is notified that the amplitude level represented by 16-bit digital data is 0 from the zero-point detecting section 46a by a detection signal. The counter 46b stops counting. The phase delay time measurement section 46 outputs a count value 4 as DT.

The phase delay time measurement section 46 uses the excitation signal RS as an original signal and directly detects the zero-cross point 47 of the square sum average signal. The phase delay time measurement section 46 can detect the phase shift amount with high accuracy.

The angle detector and the motor drive controller according to the embodiment may use another phase correction amount adjustment section instead of the phase correction amount adjustment section 36.

Figure 15:
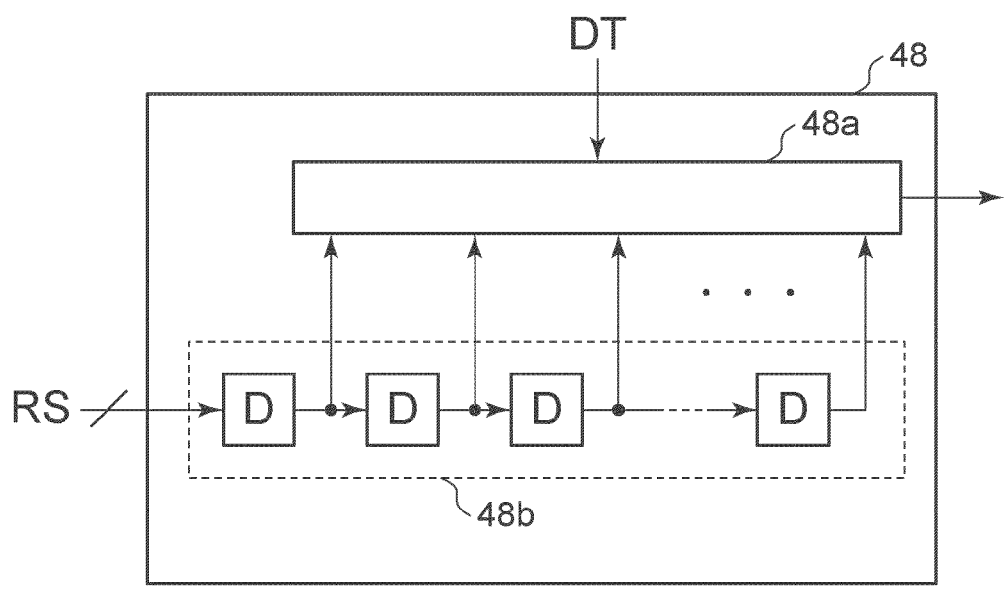
FIG. 15 is a block diagram of a phase correction amount adjuster used in the corrector of the angle detector according to the variation of the embodiment.

FIG. 15 is a block diagram of a phase correction amount adjustment section used in the angle detector according to the variation. The same reference numerals as described above represent the same components.

A phase correction amount adjustment section 48 delays the excitation signal RS with a phase delay (phase difference) corresponding to the phase delay time DT obtained by the phase delay time measurement section 46 and outputs the delayed excitation signal RS to the wave detector 24 (FIG. 2).

The phase correction amount adjustment section 48 includes a resistor circuit (multistage delay portion) 48b having flip-flops D multistage-connected in series to each other and corresponding to sixteen bits and a switching circuit (tap switching portion) 48a which selects one of or a plurality of flip-flops D according to the interval numbers 0 to 7. The sixteen flip-flops D are referred to as flip-flops D representing a serial 16-bit excitation signal obtained by parallel-to-serial converting the excitation signal represented by sixteen bits.

The resistor circuit 48b receives the input of the excitation signal RS from an initial flip-flop D. The resistor circuit 48b sequentially delays the excitation signal RS. The resistor circuit 48b has a plurality of taps. The tap is referred to as an output of each flip-flop D.

The switching circuit 48a switches and selects the plurality of taps of the resistor circuit 48b according to the magnitude of the phase delay time DT from the phase delay time measurement section 46 and generates a synchronizing signal. The switching circuit 48a outputs a corrected excitation signal from the selected flip-flop D.

The phase shift amount of the excitation signal RS is notified to the phase correction amount adjustment section 48 by the phase delay time DT. The number of delay elements required for delay is selected from a plurality of the delay elements by the phase delay time DT. Consequently, the number of the selected flip-flops D represents the phase correction amount. The phase shift amount of the excitation signal is corrected. A corrected excitation signal for synchronous detection is input to the wave detector 24.

When the phase correction amount adjustment section 36 of FIG. 12 and the phase correction amount adjustment section 48 are compared with each other, in the phase correction amount adjustment section 36 delay elements are not connected in series, and the phase correction amount adjustment section 36 is different from the phase correction amount adjustment section 48 in which the delay elements are connected in series. The circuit of the phase correction amount adjustment section 36 is simpler than the circuit of the phase correction amount adjustment section 48. The circuit size of the phase correction amount adjustment section 36 in which the delay elements are not connected in series is smaller than the circuit size of the phase correction amount adjustment section 48 in which the delay elements are connected in series.

(Other)

Each block diagram shows an example.

Although the above embodiment discloses the best mode, the resolver digital convertor 10 may detect the zero-cross point by using only one of the rising detecting section 43 and the falling detecting section 44. The resolver digital convertor 10 may detect only the rising cross points 55 and 57 or only the falling cross points 56 and 58.

The accuracy of the phase detection by the resolver digital convertor 10 having both the rising detecting section 43 and the falling detecting section 44 is higher than the accuracy of the phase detection by the resolver digital convertor 10 having only one of them.

In the description, although the voltage value 0 is used as the amplitude level of the square sum waveform at the zero-cross point, a predetermined voltage value may be used instead of the zero-cross point. The superiority of the angle detector according to the present embodiment to the product embodied by using a voltage value other than one at the zero-cross point is not lost.

In the above description, although the two-phase signals, that is, the cos φ signal and the sin φ signal are used, the angle detector according to the embodiment may use three-phase or four or more phase signal wave. Although the amplitudes of sin φ and cos φ are 1, obviously the amplitude may be other than 1.

In the above description, the excitation coil 19 rotates, and the sin phase coil 18 and the cos phase coil 17 are fixed. The side inducing the magnetic field and the side on which the magnetic field is induced may be relatively reversely arranged. The angle detector and the motor drive controller according to the embodiment may employ such an arrangement that the excitation coil 19 is fixed and the sin phase coil 18 and the cos phase coil 17 rotate.

In the above description, the ratio between the excitation period (1/10 kHz) and the rotation period of the motor 11 (1/2.5 kHz) is 1:4. The relationship between the phase of the excitation signal and the phase of the rotation angle of the motor 11 may not be 1:4 in timing in which the amplitude of the signal wave output from the ΔΣ AD converter 26 is 0 level. For example, when represented by using integers j and k, in a case where j times of the excitation period and k times of the rotation period of the motor 11 coincide with each other, the excitation signal zero-crosses, and the rotation angle of the motor 11 zero-crosses. In the relationship between a pair of the integers j and k, the angle detector and the motor drive controller according to the embodiment can provide effects similar to those obtained in the above example.

The functions of the resolver digital convertor 10 is mainly realized by ASIC (application specific integrated circuit) or FPGA (field-programmable gate array). As the signal input port in the resolver digital convertor 10 and the AD conversion section 22, analog circuits are used. The algorithm calculation in the above description is physical calculation to a signal using a gate element.

In the above description, the AD conversion section 22 outputs the differential signal wave $\sin(\theta-\phi)\cdot\sin \omega t$, and the wave detector 24 multiplies the differential signal wave $\sin(\theta-\phi)\cdot\sin \omega t$ by the excitation signal RS and outputs the differential signal $\sin(\theta-\phi)$. The resolver digital convertor 10 may perform synchronous detection with respect to the output signal of the HPF 27 in the AD conversion section 22.

While certain embodiments have been described, these embodiments have been presented by way of example only, and are not intended to limit the scope of the inventions. Indeed, the novel methods and systems described herein may be embodied in a variety of other forms. Furthermore various omissions and substitutions and changes in the form of methods and systems described herein may be made without departing from the spirit of the inventions. The accompanying claims and their equivalents are intended to cover such forms or modifications as would fall within the scope and sprits of the inventions.

What is claimed is:

1. An angle detector comprising:
an AD converter configured to analog-to-digital convert plural-phase signal waves having respective different phases obtained by amplitude-modulating an excitation wave by a rotation angle of a rotation shaft;
a corrector configured to receive an excitation signal which has a reference phase position representing a reference phase timing in an excitation period of the signal wave and the converted plural-phase signal waves from the AD converter, detect a zero-cross phase of a square sum average signal having a period half the excitation period and plural zero-cross points in the excitation period, and delay a phase of the excitation signal by an amount corresponding to a phase difference between the excitation signal and the signal wave, the corrector delaying the phase of the excitation signal by a shift amount equivalent to the phase difference from the reference phase position, according to a position of the zero-cross phase in any of plural phase intervals obtained by equally dividing the excitation period and a phase shift correction direction;
a wave detector configured to perform synchronous detection to an output signal from the AD converter in synchronization with the excitation signal whose phase is corrected; and
an angle calculator configured to calculate an estimated rotation angle using an output signal of the wave detector and output the estimated rotation angle to the AD converter.

2. The angle detector of claim 1, wherein the corrector comprises:
a square sum average calculator configured to add a square of a cosine phase signal wave and a square of a sine phase signal wave, calculate a time average value of the adding result and output the square sum average signal;
a detector configured to detect the zero-cross phase of the square sum average signal in timing in which an amplitude of the square sum average signal is a zero level and obtain the shift amount in the excitation period, using the excitation signal; and
a phase correction amount adjuster configured to correct the phase of the square sum average signal by the shift amount.

3. The angle detector of claim 2, wherein the square sum average calculator adds an average value of an amplitude of the square sum average signal.

4. The angle detector of claim 2, wherein the square sum average calculator repeats resetting of the average value of the amplitude of the square sum average signal for each designated time interval and restart of the adding.

5. The angle detector of claim 2, wherein the detector detects at least one of a rising timing in which the square sum average signal crosses the zero level during rising and a falling timing in which the square sum average signal crosses the zero level during falling.

6. The angle detector of claim 5, wherein the detector comprises a phase correction direction outputter configured to output the phase shift correction direction according to numbers representing whether the zero-cross phase of the square sum average signal in the rising timing or the falling timing belongs to any of the plural phase intervals and the reference phase positions.

7. The angle detector of claim 6, wherein the phase correction direction outputter comprises:
a sorter configured to determine the number according to an amplitude level of the excitation signal; and
an outputter configured to output the correction direction and the phase shift correction amount according to detection information that distinguishes the rising and the falling, the number, and the reference phase position.

8. The angle detector of claim 5, wherein the detector further comprises a counter which starts counting from the rising timing of the excitation signal and stops the counting according to a detection signal in the rising timing or in the falling timing.

9. The angle detector of claim 2, wherein the phase correction amount adjuster comprises:
a plurality of delay elements corresponding to a plurality of bits representing an amplitude level of the excitation signal;
a selector configured to switch between advancing the phase of the square sum average signal, returning the phase, and allowing passage of the square sum average signal according to the phase shift correction direction and the phase shift correction amount; and
an arithmetic circuit configured to execute holding of a value of the plurality of delay elements, increment or decrement of each value according to switching by the selector.

10. The angle detector of claim 2, wherein the phase correction amount adjuster comprises:
a resistor circuit configured to have a plurality of flip-flops multistage-connected in series and be inputted the excitation signal from a head of the flip-flops; and
a switching circuit configured to select one of or plurality of flip-flops from the plurality of flip-flops according to numbers of the plural phase intervals and output the excitation signal after correction to the selected flip-flop output.

11. A motor drive controller comprising:
an excitation coil provided in any one of a stator of a motor and a rotor and subjected to application of an excitation wave;
a detection coil provided in the other one of the rotor and the stator and configured to amplitude-modulate the excitation wave to the excitation coil by a rotation angle of a rotation shaft of the rotor, and generate plural-phase signal waves having respective different phases;
an AD converter configured to analog-to-digital convert the plurality of phase signal waves;
a corrector configured to receive an excitation signal which has a reference phase position representing a reference phase timing in an excitation period of the signal wave and the converted plural-phase signal waves from the AD converter, detect a zero-cross phase of a square sum average signal having a period half the excitation period and plural zero-cross points in the excitation period, and delay a phase of the excitation signal by an amount corresponding to a phase difference between the excitation signal and the signal wave, the corrector delaying the phase of the excitation signal by a phase shift amount equivalent to the phase difference from the reference phase position, according to a position of the zero-cross phase in any of plural phase intervals obtained by equally dividing the excitation period and a phase shift correction direction;
a wave detector configured to perform synchronous detection to an output signal from the AD converter in synchronization with the excitation signal whose phase is corrected;
an angle calculator configured to calculate the rotation angle using an output signal of the wave detector and output the calculated rotation angle to the AD converter; and
a controller configured to control an inverter circuit which generates a drive current for the motor according to the rotation angle calculated by the angle calculator.

12. The motor drive controller of claim 11, wherein the corrector comprises:
a square sum average calculator configured to add a square of a cosine phase signal wave and a square of a sine phase signal wave, calculate a time average value of the adding result and output the square sum average signal;
a detector configured to detect the zero-cross phase of the square sum average signal in timing in which an amplitude of the square sum average signal is a zero level and obtain the shift amount in the excitation period, using the excitation signal; and
a phase correction amount adjuster configured to correct the phase of the square sum average signal by the shift amount.

13. The motor drive controller of claim 12, wherein the square sum average calculator adds an average value of an amplitude of the square sum average signal.

14. The motor drive controller of claim 12, wherein the square sum average calculator repeats resetting of the average value of the amplitude of the square sum average signal for each designated time interval and restart of the adding.

15. The motor drive controller of claim 12, wherein the detector detects at least one of a rising timing in which the square sum average signal crosses the zero level during rising and a falling timing in which the square sum average signal crosses the zero level during falling.

16. The motor drive controller of claim 15, wherein the detector comprises a phase correction direction outputter configured to output the phase shift correction direction according to numbers representing whether the zero-cross phase of the square sum average signal in the rising timing or the falling timing belongs to any of the plural phase intervals and the reference phase positions.

17. The motor drive controller of claim 16, wherein the phase correction direction outputter comprises:
a sorter configured to determine the number according to an amplitude level of the excitation signal; and
an outputter configured to output the correction direction and the phase shift correction amount according to detection information that distinguishes the rising and the falling, the number, and the reference phase position.

18. The motor drive controller of claim 15, wherein the detector further comprises a counter which starts counting from the rising timing of the excitation signal and stops the counting according to a detection signal in the rising timing or in the falling timing.

19. The motor drive controller of claim 12, wherein the phase correction amount adjuster comprises:
a plurality of delay elements corresponding to a plurality of bits representing an amplitude level of the excitation signal;
a selector configured to switch between advancing the phase of the square sum average signal, returning the phase, and allowing passage of the square sum average signal according to the phase shift correction direction and the phase shift correction amount; and
an arithmetic circuit configured to execute holding of a value of the plurality of delay elements, increment, or decrement of each value according to switching by the selector.

20. The motor drive controller of claim 12, wherein the phase correction amount adjuster comprises:
a resistor circuit configured to have a plurality of flip-flops multistage-connected in series and be inputted the excitation signal from a head of the flip-flops; and
a switching circuit configured to select one of or plurality of flip-flops from the plurality of flip-flops according to numbers of a plurality of phase intervals obtained by dividing the excitation period and output the excitation signal after correction to the selected flip-flop.

* * * * *